(12) United States Patent
Pettersson et al.

(10) Patent No.: US 9,443,308 B2
(45) Date of Patent: Sep. 13, 2016

(54) POSITION AND ORIENTATION DETERMINATION IN 6-DOF

(71) Applicant: HEXAGON TECHNOLOGY CENTER GMBH, Heerbrugg (CH)

(72) Inventors: Bo Pettersson, London (GB); Knut Siercks, Mörschwil (CH); Eugen Voit, Au (CH); Jürg Hinderling, Marbach (CH); Benedikt Zebhauser, Rorschach (CH); Klaus Schneider, Dornbirn (AT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 162 days.

(21) Appl. No.: 14/363,102

(22) PCT Filed: Dec. 5, 2012

(86) PCT No.: PCT/EP2012/074552
§ 371 (c)(1),
(2) Date: Jun. 5, 2014

(87) PCT Pub. No.: WO2013/083650
PCT Pub. Date: Jun. 13, 2013

(65) Prior Publication Data
US 2014/0286536 A1    Sep. 25, 2014

(30) Foreign Application Priority Data

Dec. 6, 2011 (EP) .................................. 11192220

(51) Int. Cl.
*G06K 9/00* (2006.01)
*G06T 7/00* (2006.01)
(Continued)

(52) U.S. Cl.
CPC ............. *G06T 7/0044* (2013.01); *E02F 3/842* (2013.01); *E02F 9/261* (2013.01); *G01C 15/002* (2013.01);
(Continued)

(58) Field of Classification Search
CPC ............. G06K 9/6211; G06K 9/4609; G06K 9/00214; G06K 9/00208; G06T 2207/10028; G06T 17/00
See application file for complete search history.

(56) References Cited

U.S. PATENT DOCUMENTS 5,771,978 A * 6/1998 Davidson ............. G01C 15/002
                                                    172/2
5,805,275 A * 9/1998 Taylor ................... G01S 7/4811
                                                    180/167
(Continued)

FOREIGN PATENT DOCUMENTS

CN    102252653 A    11/2011
EP    1 171 752 B1    7/2005
(Continued)

OTHER PUBLICATIONS

Gruen, Armin, and Devrim Akca. "Least squares 3D surface and curve matching." ISPRS Journal of Photogrammetry and Remote Sensing 59.3 (2005): 151-174.*

(Continued)

*Primary Examiner* — Stephen R Koziol
*Assistant Examiner* — Jonathan S Lee
(74) *Attorney, Agent, or Firm* — Maschoff Brennan (57) ABSTRACT

A method for a six degree of freedom position and orientation determination of a known shape in a scenery is disclosed. The method includes taking a range image with a range imaging camera and a visual picture with a digital camera. The range imaging camera includes a sensor array with a first number of pixels. Determining a 3D cluster of points from range information collected from the sensor array to a point of the scenery. the digital camera comprises an image sensor having a second number of pixels, resulting in a 2D picture. A stored 3D digital representation of the known shape may be fitted in a virtual space to match the reproduction of the known object in the 2D picture and the 3D cluster of points and determining the six degree of freedom position and orientation of the known shape according to the virtual match.

37 Claims, 5 Drawing Sheets

(51) Int. Cl.
  *G01C 15/00* (2006.01)
  *G01C 15/06* (2006.01)
  *E02F 3/84* (2006.01)
  *E02F 9/26* (2006.01)
  *G06T 17/00* (2006.01)

(52) U.S. Cl.
  CPC ............... *G01C 15/06* (2013.01); *G06T 17/00* (2013.01); *G06T 2207/10024* (2013.01); *G06T 2207/10028* (2013.01)

(56) References Cited

U.S. PATENT DOCUMENTS

| | | | | |
|---|---|---|---|---|
| 6,166,744 | A * | 12/2000 | Jaszlics | G06T 17/00 345/421 |
| 6,173,066 | B1 * | 1/2001 | Peurach | G06F 17/3079 348/169 |
| 6,608,913 | B1 | 8/2003 | Hinton et al. | |
| 6,675,122 | B1 * | 1/2004 | Markendorf | G01C 15/002 356/614 |
| 7,844,106 | B2 * | 11/2010 | Pfister | G06T 7/0046 345/418 |
| 8,379,969 | B2 * | 2/2013 | Barrois | G01B 11/245 382/154 |
| 8,872,851 | B2 * | 10/2014 | El Choubassi | G06T 7/0081 345/633 |
| 2005/0002555 | A1 | 1/2005 | Kumiya et al. | |
| 2005/0190972 | A1 * | 9/2005 | Thomas | G06K 9/209 382/218 |
| 2005/0265583 | A1 * | 12/2005 | Covell | G06K 9/00369 382/103 |
| 2006/0221072 | A1 * | 10/2006 | Se | G01C 11/06 345/420 |
| 2007/0216332 | A1 * | 9/2007 | Lambert | B25J 9/1697 318/568.1 |
| 2008/0069435 | A1 * | 3/2008 | Boca | G01B 11/25 382/153 |
| 2008/0310757 | A1 * | 12/2008 | Wolberg | G06K 9/00208 382/285 |
| 2010/0046802 | A1 | 2/2010 | Watanabe et al. | |
| 2010/0166294 | A1 * | 7/2010 | Marrion | G06K 9/6211 382/154 |
| 2010/0220891 | A1 * | 9/2010 | Lefevre | G06T 7/20 382/103 |
| 2011/0255746 | A1 * | 10/2011 | Berkovich | G06F 17/30247 382/103 |
| 2011/0273442 | A1 * | 11/2011 | Drost | G06K 9/6211 345/419 |
| 2012/0327190 | A1 | 12/2012 | Massanell et al. | |
| 2013/0329012 | A1 * | 12/2013 | Bartos | H04N 13/0246 348/46 |
| 2015/0049186 | A1 * | 2/2015 | Pettersson | G01B 21/047 348/135 |

FOREIGN PATENT DOCUMENTS

| | | |
|---|---|---|
| JP | 2011-179980 A | 9/2011 |
| WO | 2005/039836 A2 | 5/2005 |
| WO | 2006/075017 A1 | 7/2006 |
| WO | 2011/104199 A1 | 9/2011 |

OTHER PUBLICATIONS

Cain, S.C., Multiframe fusion of undersampled 3D imagery, Proc. SPIE 8520, Unconventional Imaging and Wavefront Sensing 2012, 85200F (Oct. 15, 2012); doi:10.1117/12.930524.*
European Search Report dated May 23, 2012 as received in Application No. EP 11 19 2220.

* cited by examiner

POSITION AND ORIENTATION DETERMINATION IN 6-DOF

FIELD OF THE INVENTION

The present invention relates generally to a method for a six degree of freedom position and orientation determination of a three dimensional known shape and a six degrees of freedom spatial position and orientation determination device.

BACKGROUND

In many applications a determination of the position and orientation of a target object in 3D space is required. Therein the spatial posture of a target object in space by measuring its spatial coordinates and its spatial orientation has to be determined, resulting in up to six degrees of freedom which needs to be evaluated. The target object can be the object of interest itself or a dedicated target object which is attached thereto.

For example, in WO 2005/039836 a robot arm positioning control by observing position and orientation in 3D space of a working tool attached to the robots arm by a camera system is presented.

Controlling of construction machinery is another application, e.g. as described in U.S. Pat. No. 5,771,978, wherein a Tracking-Station is tracking a retro reflector as a target mark which is attached to a working tool of the machine, in this example a blade of a dozer for moving earth into a desired shape.

The document EP 1 171 752 (—honoured with the EPO inventors award in 2010—) describes another application, wherein the position and orientation of a measurement probe for coordinate measurement is determined in six degrees of freedom by a tracker-device, which is tracking multiple dedicated discrete singular reference points that are attached to the probe for determining the posture of the measuring probe-tip in six degrees of freedom.

The above mentioned methods of a high accuracy posture determination of a target object require rather complicate and expensive surveying apparatus, e.g. devices such as Laser-Scanners, Total Stations, Tracking Stations, etc.

Alternatives, such as stereographic imaging, require complex multiple camera and illumination setups and are of comparably low accuracy and suffer from ambiguity problems in measurement.

Pattern projection systems, like the DAVID laser scanner project from TU-Braunschweig are also known. As e.g. published on www.david-laserscanner.com, a laser pattern, e.g. a line, is scanned over a target and a digital video camera records the resulting images, whereof a 3D-point-cloud-model of the scanned object is created. A photographic image of the camera can also be used to texture the resulting 3D-Model. Due to the scanning, a digitalisation of the full field of view of the camera takes time and is therefore improper for evaluating or observing non-steady objects.

In Microsoft's technical report on camera calibration, published in the "IEEE transactions on pattern analysis and machine intelligence", Vol. 22, No. 11, November 2000, a calibration systems for digital picture cameras for 3D computer vision is described, which observes a single planar pattern at different orientations to achieve a camera calibration to allow a more accurate extraction of metric information from 2D images taken by the camera.

In US 2005/0002555 a first set of stored images of a workpiece—taken from different directions—are compared to an actual image of a workpiece. The camera is the moved to closely resemble the stored image of the first set and a second comparison with a second set of stored images—taken with a narrower pitch—is done to determine the position and attitude of the workpiece.

For a 3D measurement by gathering 3D point cloud, also the usage of Range Imaging Modules (RIM) is a known technique, which can digitize a whole scenery in "one shot". A RIM-camera comprises in principle an array of pixels functioning as optoelectronic distance meters, e.g. based on a time of flight measurement (TOF) of optical radiation, e.g. by pulse, phase, signal-shape or interferometrical principles which are known in the art, e.g. from "Electronic Distance Measurement" from J. M. Rüeger, Ed. 4, Springer-Verlag, Berlin, Heidelberg 1996. A range image taken by such a RIM-camera comprises distance information for each of the pixels of the camera, resulting in a 3D image of the scenery taken from a single point of view. The measurement is thereby done in polar coordinates according to the angular field of view of a camera-pixel and the therewith determined distance in a unit of length.

A graphical view of the measured RIM-image can e.g. be presented in a two dimensional representation by luminescence—or colour keying of the distances into the 2D picture of the view of the RIM-image. Alternatively, it can be presented in an axonometric view or by a real 3D display. In addition to the range information, also an intensity of the scattered back distance measurement radiation can be determined by the RIM camera an provided in an image.

Nevertheless, the available RIM-devices are often suffering from relatively low resolutions and accuracies, e.g. a resolution of the field of view are presently well below 1 Mega pixels (e.g. 176×144 pixels=0.025 Mega-Pixels) and a distance resolution in the cm range is a common value. There are certain known techniques to improve those parameters, like zooming and angular movement of the field of view, but they all suffer from drawbacks like again prolonging the measurement time which is an important parameter, in particular in the case of measuring a potentially moving target.

For example, WO 2006/075017 presents a method and geodetic apparatus for surveying at least one target. Therein, a range imaging module (RIM) comprising sensors in a matrix arrangement, e.g. 32×32 sensors are used for providing a range image. The range image provides a so called cluster of points or point cloud information comprising the range of the target points imaged by the respective pixels of the sensor. In order to improve the accuracy of the range image, range images of details subsequently reduced in size can be taken. However, although this may improve the accuracy of the range image in a certain manner, due to the relative low resolution of the range image, it is still difficult to exactly address distinctive target points of the target which can be extremely important in case of smaller and/or moving targets which are changing their orientation and position while being surveyed. Another drawback is the prolonged measurement time for measuring the full scenario with the respective high resolution and accuracy.

In CN 102252653, a TOF camera is used and three identifiable objects from a coordinate information database of target objects are selected as mark points for position and attitude parameter determination.

As mentioned, a general drawback of RIM-Imaging often is the low image resolution of the available RIM-cameras in particular compared to the state of the art digital photographic cameras having resolutions of up to tens of Mega-Pixels and more.

The proceedings of "3DPVT'08—the fourth international symposium on 3D data processing, visualization and transmission"—at Georgia Institute of Technology, June 2008, teaches the usage of edges or silhouette cues from a 2D image together with RIM-Camera data for enhancing the 3D reconstruction of an object. Therein, multiple cameras are used for taking RIM images and video pictures from multiple points of view, whereof a 3D model can be derived—also of concave surfaces which are otherwise known to be quite difficult to handle by stereographic imaging.

The system of US 2010/0046802 describes an approach which is using a combination of a RIM-camera and a picture camera for enhancing 3D resolution for an enhanced depth feel for a movie or still camera by the presented distance estimation apparatus. The document comprises different aspects and embodiments of such an approach and can serve as a reference for some of the underlying principles of the present invention. In particular edge-extraction techniques and other aspects of matching a range image and a corresponding visual picture are elaborated therein.

The prior art designs are either requiring complicated and expensive measurement apparatus or are of low accuracy or requiring long measurement times.

Some embodiments of the present invention may provide for an improved method and apparatus to determine position and orientation of an object in a viewed scenery, in particular in 3D space in six degrees of freedom.

Some embodiments of the present invention may achieve high accuracy in the six degrees of freedom measurement of a target object while keeping the measurement setup simple and preferably to do the measurement by a single apparatus from a single point of view.

Some embodiments of the present invention may provide for an improved position and orientation determination with a short measurement time.

Some embodiments of the invention may provide a method for determining the position and orientation in six degrees of 15 freedom of an object of known shape inside of an evaluated scenery with high accuracy.

Some embodiments provide for a 6-DOF measurement with a reduced measurement time, in particular to allow measurements of moving objects.

Some embodiments of the invention may provide a method of 3D measurement which can in particular be used to precisely measure a distinct point of the measurement object, preferably by tactile means, and thereby enhance a recorded point cloud in positional measurement accuracy.

Some embodiments of the invention may also provide a measurement method which is capable of measuring parts of the measurement object which are shaded from the measurement devices point of view.

SUMMARY

The present invention relates to a method for a six degree of freedom position and orientation determination of a three dimensional known shape in a scenery.

According to the invention, the method comprises a taking of a range image by means of a range imaging camera. The range imaging camera comprises a range image module (RIM) having a sensor array with a first number of pixels, wherein for each of the first pixels a range information from the sensor to a point of the scenery is determined, resulting in a 3D cluster of points. The RIM, as known in the art, can be embodied by a light emitting means, emitting modulated optical radiation in at least one visible or preferably invisible spectral range, directed to a measurement target and an array of electro-optical sensor means for converting the part of the optical radiation scattered back from the measurement target into electrical signals.

According to the velocity of propagation of the radiation and the time of flight taken by the radiation to travel the distance to the object forth and back between the module and the target, the distance can be determined, in particular according the delay of a light pulse from transmit to receive or according to phase differences of a modulated light signal or bursts of modulated light signals. A known reference distance can serve as calibration means. Ambiguities can for example be resolved by the usage of different modulation frequencies. The receiving sensor elements of the array are built in such a way to cover each an angular field of view in direction to the target object, preferably in a non overlapping manner, so the field of view of the RIM is resolved in pixels with a resolution equal to the rows and columns of the sensor array.

Thereby, three a dimensional resolution of the target in the field of view of the RIM is resolved in distance, wherefore the triplets of the distance and the direction of the optical axis of the pixels field of view resulting in polar coordinates of surface points of the target object as a cluster of point or point cloud representation of the RIMs field of view which comprises the target object. Furthermore, for each pixel, also the intensity information of the scattered back radiation can be evaluated and further processed.

The method further comprises a taking of a visual picture by means of a digital camera (CAM). The digital camera comprises an image sensor (e.g. a CCD or CMOS array or the like) having a second number of pixels, wherein the second number of pixels of the digital camera can be higher than the first number of pixels, resulting in a 2D picture with an second angular resolution of the cameras field of view which can been higher than the one of the RIM. The picture is a digital photographic image, in particular comprising intensity and spectral information for an array of pixels, comprising angular information of each pixel according to the pixels field of view together with luminosity and chromatic information. Thereby, optical patterns or textures of the target in the spectral range of the digital camera can be observed, as well as shading effects, different coloured sections of the target object.

The field of view of the digital camera and also of the RIM can be shaped by some optics, e.g. comprising lenses, filters, mirrors, etc. as known in the art of optics. Possible optical or geometrical distortions of the pixel arrays field of view can be compensated by the either optical means or numerical means in the evaluation software.

According to the present invention, the relation of the first and the second pixels fields of view is known, or made known by a calibration with a reference object observed by both the RIM and the photographic camera.

The scenery can be defined a the area of interest, seen from a point of view of the measurement instrument comprising RIM and CAM, wherein at least a part of the target object resides and which can be covered by the RIMs and CAMs field of view. To increase the range of the scenery, the RIMs and/or CAMs field of view can be moveable, wherein the amount of movement has to be determinable, either by a dedicated measurement means or by extracting the movement information from the RIM- and/or CAM-data.

The mentioned three dimensional known shape is known in such a way that a 3D digital representation of the known shape is available in a computation system involved in measurement. The digital representation can be provided as geometric CAD-model represented by numerical information of the shapes shape and size. Alternatively, this information can be gathered by so called calibration measurement of the shape for "learning" its shape and making it known.

By geometrically fitting of the stored 3D digital representation or known model of the known shape in a virtual space, a match with the reproduction of the known shape in the 2D picture and the 3D cluster of points can be achieved. Therein, the digital representation of the object is aligned, e.g. moved and rotated in virtual space to result in the same posture as the known shape has in real space, which is defined by a match of the virtual view of the shape in the calculated digital numerical representation in virtual space and the view as seen from the CAM and/or RIM which is reproduced in form of the 2D/3D information taken by them.

According to the virtual match as described above, the six degree of freedom position and orientation of the known shape in the scenery is determined, by the information taken from the virtual alignment of the geometrically manipulated digital representation of the known shape in virtual space, which then corresponds to the real position and orientation of the known shape in the real scenery observed by the method.

BRIEF DESCRIPTION OF THE DRAWINGS

The method according to the invention and the devices and setup according to the invention are described or explained in more detail below, purely by way of example, with reference to working examples shown schematically in the drawings. Specifically.

DETAILED DESCRIPTION

The diagrams of the figures should not be considered as being drawn to scale.

Figure 1:
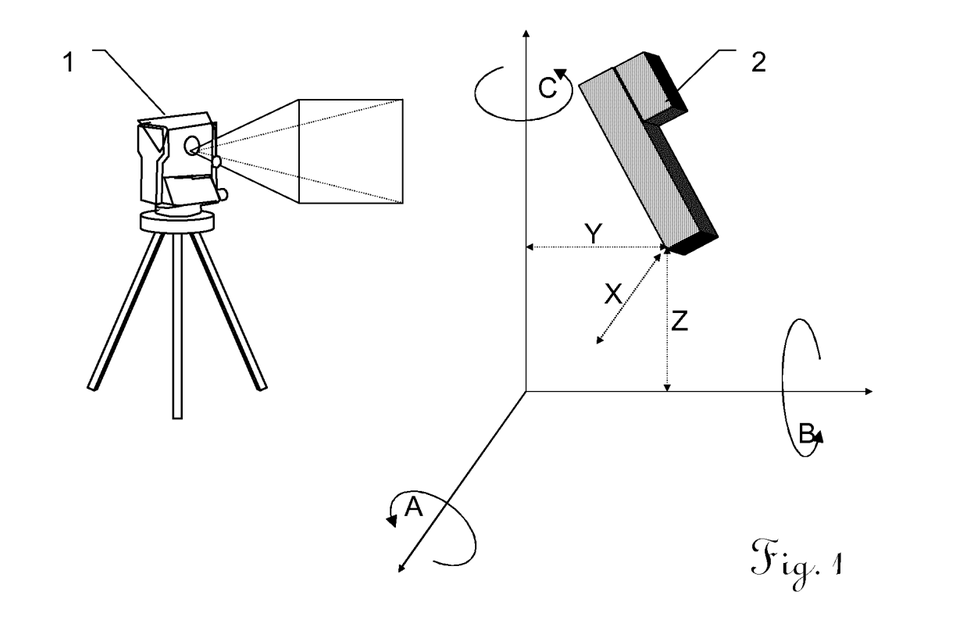
FIG. 1 shows an embodiment of a measurement setup according to the invention.
Figure 2:
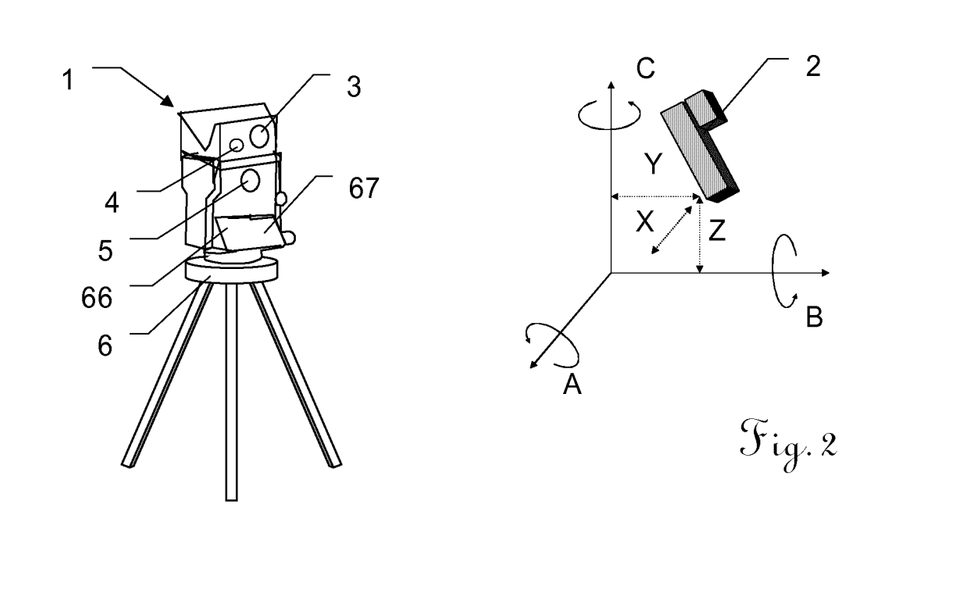
FIG. 2 shows an abstracted view of an exemplary embodiment of a device according to the invention.

FIG. 1 shows an embodiment of a six degrees of freedom spatial position and orientation determination device 1 according to the present invention, comprising a RIM-unit 4, comprising a range imaging camera for determining a range image as a three dimensional point cloud information with a first resolution, a CAM-unit 5, comprising a visual picture camera for determining a two dimensional visual picture of the scenery with a second resolution, in particular in multiple colours. In the further described embodiment, the second resolution is greater than the first resolution, which can also be the other way round or the two resolutions can also be equal. Another option is a skipping of pixels in the readout of the CAM- and/or RIM-sensor, wherein the physical sensor-resolution might be different from the actually evaluated resolution, for example for the sake of increased evaluation speed.

The device 1 also comprises a digital image processing unit 66, in particular built in such a way to determine edge and face information in the visual picture and a six dimensional known shape matching unit 67 built in such a way to determine a three dimensional best fit of a 3D digital representation of a known shape within the range image and the visual picture and extracting position and orientation of the known shape.

It also shows a system according to the present invention comprising the device 1 and a reference object as the known shape 2. Therein, the reference object is formed in it's outer shape in such a way, to achieve an unambiguous identification of its position and orientation in space from a single point of view. Preferably, the reference object being reflective for the measurement-wavelength of the range imaging camera 4 and having characteristic identifiable optical features in the wavelength(s) captured by the visual camera 5.

Figure 3:
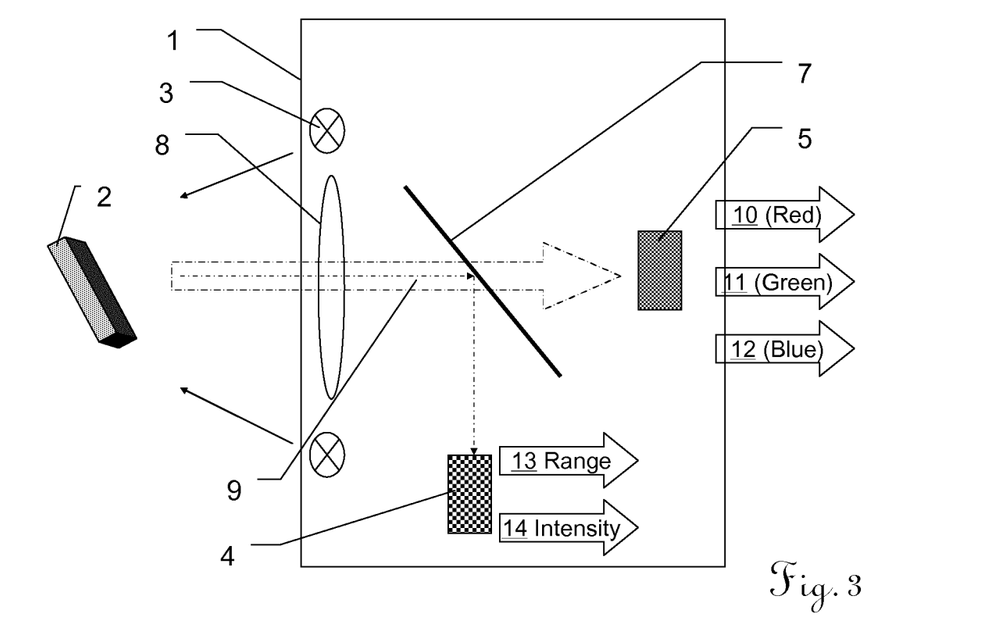
FIG. 3 shows an embodiment of a device according to the invention where the RIM- and Image-Unit are arranged coaxial.

As shown in FIG. 3, the visual picture 14 and the range image 13 can be taken from a single measurement apparatus 1, in particular with a single line of sight 9, preferably wherein the taking of the range image and the visual picture is synchronized in time. The illustration shows the light source for RIM measurement 3 and the RIM-Sensor 4 which are guided through the same objective lens 8 of the device 1 as the photographic image pickup means 5 is using. The wavelengths of the range imaging and the visual picturing are in this example separated by the dichromatic mirror 7. The picture comprises spectral or colour information 10,11, 12 for each pixel and the range image comprises range information 13 of each pixel which can be combined with intensity information 14 of the scattered back radiation. This evaluation of intensity information determined from the reflected intensity of the range imaging light received by the range camera, in particular as monochrome intensity values of the distance measurement light scattered back by the known shape, can be included in the virtual matching and fitting.

Figure 4:
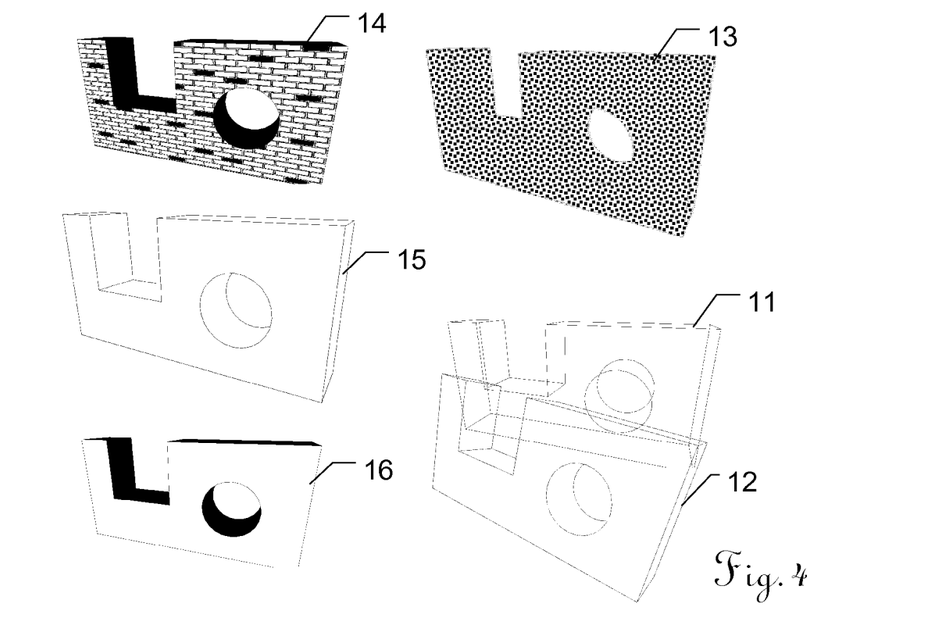
FIG. 4 illustrates an example of the information gathered by the device according to the invention.

FIG. 4 illustrates the gathered data according to the invention. Therein the known shape 2 is represented by it's digital representation 11—shown as a CAD-model. The photographical CAM-unit takes a picture 14 as shown, which preferably is a 2D colour image. The RIM-unit 3,4 determines a point cloud representation 13 of the object as illustrated by the dots for which a distance has been evaluated. Out of the CAM- and RIM-information, edges 15 and or faces 16 can be extracted. Due to the high resolution of the visual picture from the CAM-unit in this embodiment, the edges and faces can be determined with a spatial accuracy, higher than the one of the RIM-unit. Those extracted data can be matched to the digital representation 11, by manipulations in virtual 3D space to achieve a best fit. Multiple information can thereby be processed and combined by a maximum likelihood algorithm or the like. The position and orientation of the best fit in virtual space reveals the position and orientation of the known shape 2 in the scenery.

Figure 5:
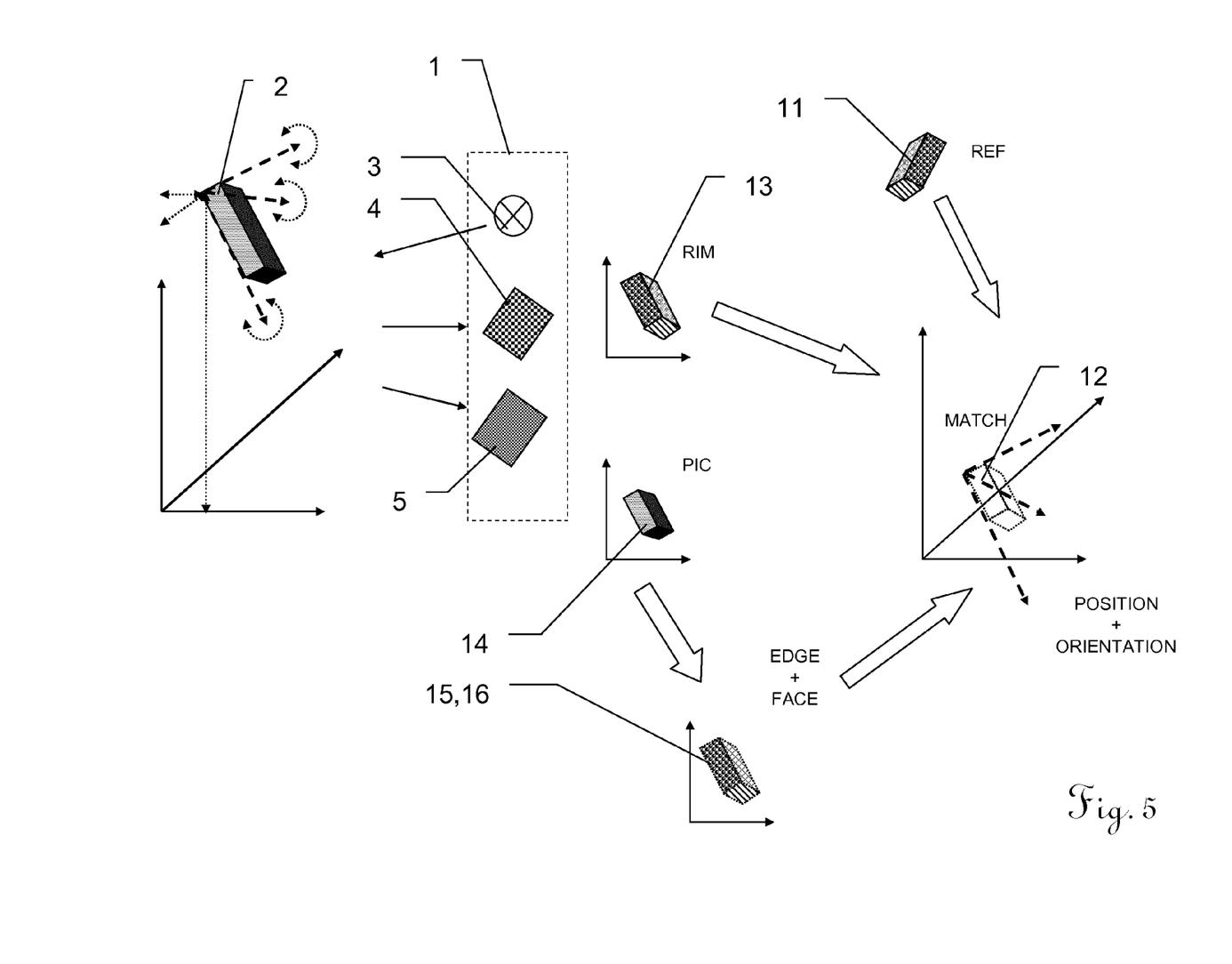
FIG. 5 illustrates the steps of matching and fitting for determining the spatial information.

FIG. 5 illustrates a schematic sketch of the functional principle of a method for spatial location and posture or six degree of freedom position and orientation determination according to the present invention.

Therein a three dimensional known shape 2, as volumetric object of known geometrical shape, which is placed in a scenery, is observed by a range imaging camera 4. The range camera 4 is taking a range image of the scenery by means of a range image module RIM, having a sensor array with a first number of pixels. For each of the first pixels, a range information from the sensor to a point of the scenery is determined, resulting in a cluster of three dimensional point information 13, representing the 3D surface information seen from range camera by the RIMs field of view.

The object of known geometrical shape 2 is further observed by taking a visual photographic picture with a digital camera 5. The camera comprises an image sensor with a second number of pixels, which can record a 2D picture 14, in particular a color picture comprising intensity and spectral information for each of the pixels, according to the light received within the image sensors field of view. The second number of pixels of the 2D picture camera 5 can therein be higher than the first number of pixels of the RIM-camera, whereby the angular resolution of the field of view of the scenery and the therein comprised known shape 2 in the 2D representation 14 is higher than the one of the 3D point cloud 13.

The relation of the first and the second pixels fields of view is known and the angular fields of view of the pixels of the RIM and CAM pixels can be assigned to each other.

This relation of the fields of view of the first and the second pixels can be used in geometrically fitting of the stored 3D digital representation 11 of the known shape in a virtual space to virtually match with the reproduction of the known shape and/or the relation can be used in determining six degree of freedom position and orientation of the known shape 2.

The know shape 2 is known is such a way that a 3D digital representation 11 of the known shape 2 is available or can be generated, e.g. in form of a stored CAD-model. This digital representation 11 can be moved and rotated in a virtual space in a computing system and virtual views of the digital representation of the known shape can be numerically generated as two and/or three dimensional data.

The 3D digital representation 11 of the known shape 2 is geometrically manipulated in virtual space by translation and rotation in six degrees of freedom in such a way, to match 12 its virtual view with the reproduction of the known object in the 2D picture and the 3D cluster of points.

According to the matching virtual alignment, determining the six degree of freedom position and orientation of the known shape in the scenery is achieved and the known shape 2 can thereby be surveyed in six degrees of freedom an the known shape's position and orientation in the scenery can be measured.

The RIM-camera 4 can also be a colour RIM, with a sensor working in for example the RGB-colour space—similar to a 2D digital imaging device—and an RGB-Illumination which be embodied by an emission of red green and blur light pulses, which can be done subsequent or in parallel. In this case, the RIM-resolution would be equal to the CAM-resolution, or—e.g. when interpreting a group of three colour CAM-pixels as a single image pixel coloured with a mixture of the three-colours—the 3D-RIM resolution could also be higher than the one of the colour picture. This results in three range images—one for each colour. The summed to colourize achieve a colourized 3D Image. The ranges of the three RIM-images can be combined (determining a mean value if all three images have the same field of view or geometrically interpolated, if the fields of view of the pixels of the three images are shifted in a sub pixel range for enhancing 3D resolution.

Beside RGB-, also other colour spaces are known, e.g. also with more than three colours. Another option can be to add a "fourth colour", which is dedicated to the RIM-measurement, e.g. a single R+G+B+Infrared sensor, whereby a single piece of hardware embodies both of an infrared-RIM- and colour-CAM-unit, e.g. with equal resolution. As 3D-RIM-evaluation can (e.g. due to higher computational effort) achieve only lower frame-rates than CAM-picture-evaluation, some RIM-pixels can be skipped during evaluation. In particular when leaving out pixels, the order of the evaluated/skipped RIM-pixels can be alternated in evaluation. This can result in both, fast frame rates with low resolution—due to the increased frame rate by omitting of pixels in evaluation—and at the same time higher resolution at lower a lower frame rate—as multiple frames will successively cover all of the pixels, resulting in full sensor resolution.

An extracting of a 3D geometrical information by combining information from the visual picture 14 and information from the range image 13 can be accomplished, in particular wherein the combining comprises a matching of at least one geometrical feature of the known shape 2 in both of the range image 13 and the visual picture 14 and a further matching of the geometrical feature in the 3D digital representation 11 within the combined information.

This can be done by a first matching of the 3D digital representation 11 with the visual picture 14 and a second matching of the 3D digital representation 11 with the range image 13. Thereof, determining the position and orientation by combining the results of the first and the second matching, in particular according to an adjustment calculus or a maximum likelihood algorithm can be achieved.

The matching 12 can comprise identifying a face by combining edge/face extraction 15,16 of the face in the visual picture 14 and/or edge/face detection 15,16 in the range image 13, preferably by fitting planes in the cluster of points.

Then a matching of the identified face and/or edge information with a corresponding face or edge of the 3D digital representation 11, in particular according to a least square or maximum likelihood algorithm, can be done in the matching process for fitting the image and RIM information 14,13. Preferably, multiple faces and/or edges are three dimensionally matched and the results are combined and interpolated to increase measurement accuracy.

Further, a recognition of textural structures within the visual picture, in particular on the known shape, can be included in the determination. Thereby the method can further comprise an additional position and orientation determination according to the appearing size of the known shape 2 and/or its texture in the visual picture 14. For example, the known textures and or colours of the known object can be used for deriving uniqueness in the position and orientation determination. In particular, in case of an ambiguous geometrical shape of the known object an inclusion of the textural information can be used.

A directional dithering of an optical axis of the range camera relative to an optical axis of the digital camera in a sub-resolution of the first pixels can be used to enhance resolution. This dithering of the optical axis, e.g. of the RIM 4 compared to the CAM 5 can in a simple way be introduced by means of a reversely used (or so to say misused) optical image stabilization unit, such as known from digital photographic and video cameras, (like SONY "steady-shot"-technology, or similar approaches from other vendors). Thereby multiple of the directional dithered low resolution range images can be combined for increasing the resolution of the cluster of points beyond a resolution of the first pixel.

Obviously, by the cost of increase measurement time due to the required multiple measurements in each of the dithered directions.

Optionally the RIM-unit 4 and CAM-unit 5 can be movable, in particular motorized movable, relative to it's mounting such as the shown tripod 6. Thereby the field of view of the device can be moved, e.g. to keep the known shape in the field of view or to alternatively achieve the above mentioned dithering.

Figure 6:
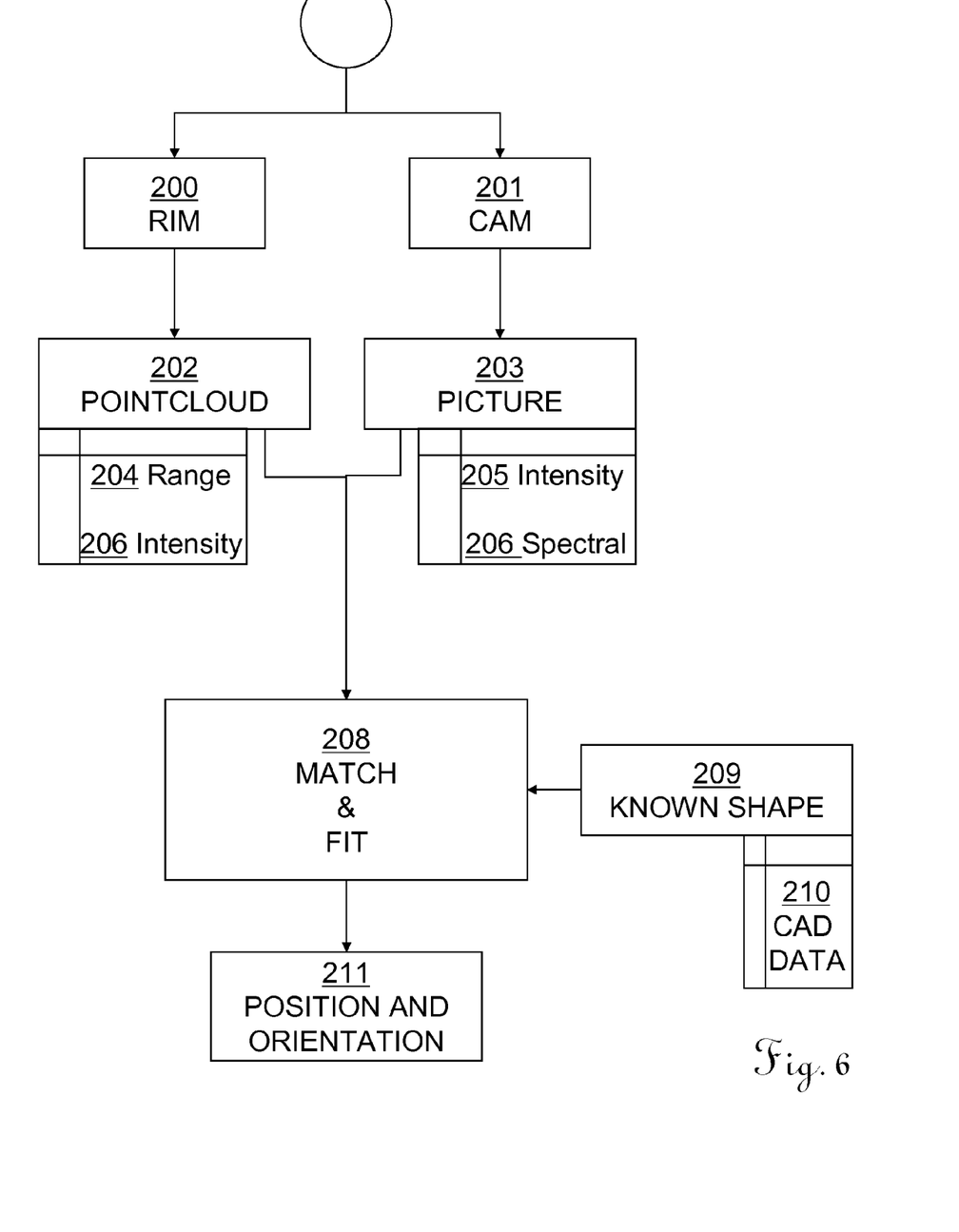
FIG. 6 illustrates an exemplary flowchart of the method according to the present invention.

FIG. 6 shows a simplified flowchart of the method according the present invention. Therein a RIM-image 200 and a CAM-picture 201 are taken and a visual picture 203—comprising an angular array of intensity and optionally spectral data—and a point cloud 202—comprising an angular array of range and optionally intensity data—are captured. The takings are preferably synchronized in time. A reproduction of the known shape is generated of the captured information and is matched in virtual space in step 208 to the digital representation 209 of the known shape 2, e.g. in form of stored CAD-data 210.

The virtual match is then used to determine the 6-DOF position and orientation of the known shape in the scenery captured by the device 1, as shown in step 211.

The above mentioned steps can be described as a three dimensional identification and fitting of a digital representation of the known shape in the geometrical information gathered by a RIM- and CAM-unit and processed by a digital image processing unit, in particular built in such a way to determine edge and face information in the visual picture which can involve extracting of vectorial information of the scenery, e.g. comprising an extracting of vector-information from the visual picture by edge detection and a combining the edge information with the point cloud information from the RIM image and/or a vectorial face detection. A consolidation module can be used for combining information from the RIM-unit and the CAM-unit for determining an accurate three dimensional geometrical information of the scenery, preferably comprising a match of the vectorial information and the point cloud information with the known digital representation. As geometrical object of higher order can be better, in particular faster, matched than points, an increased measurement rate and/or matching accuracy can be achieved.

For example, a matching and fitting can be explained in a simplified manner as utilizations of supporting points from the range image in combination with the 2D visual image and a determination of a plane on a face of the reference object by at least three supporting points from the range image. The plane can then be fine adjusted according to edges of a face detected in the visual picture and/or textural structures on the face of the reference object.

In addition, a deriving of range information of the reference object dependant on the appearing size of the object in the visual picture as additional information, can be used to gain additional information. A camera calibration as e.g. presented in the above mentioned Microsoft document can be used therewith. Also, an inclusion of greyscale values of shaded or semi-shaded surfaces of the target object can be included in the evaluation for improving a 3D reconstruction.

The digital representation of the known shape can also be established by a teaching-in of the reference object by means of determining the known shape by the apparatus itself. The teaching-in of the reference object can also be done by defining the known shape by a numerical input of geometrical data or a numerical parameterisation of a virtual reference object.

Figure 7:
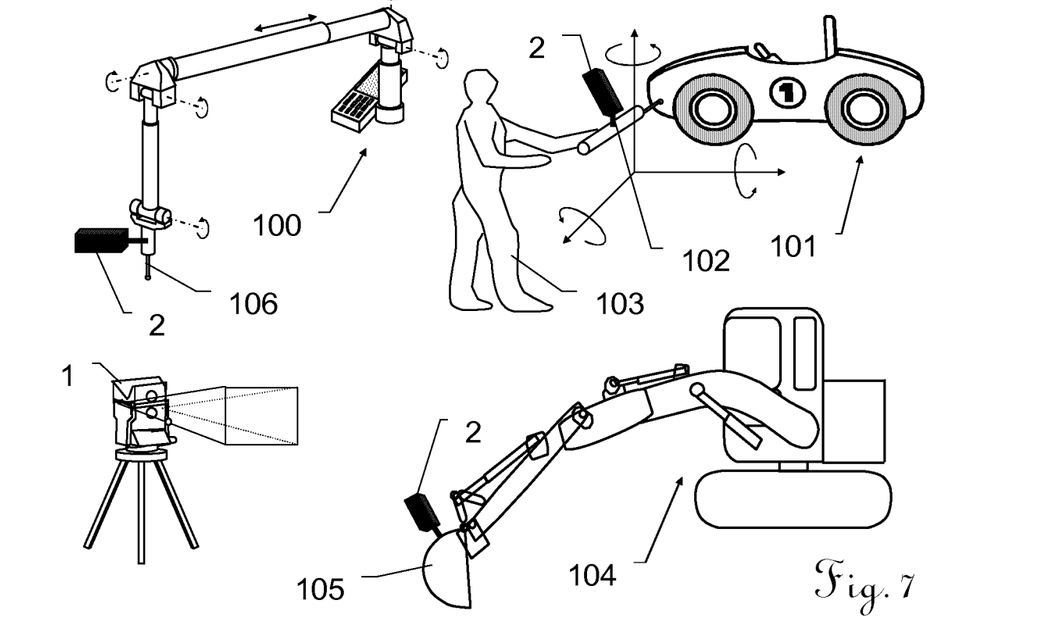
FIG. 7 shows examples of applications and measurement-tasks coverable by the present invention.

As shown in FIG. 7 by illustrations of usage examples, the method according to the present invention can be used for determining a dependent position and orientation of an item attached to the known shape 2. Therein the known shape—as a known three dimensional solid volumetric body having a three dimensional outer configuration facilitating a precisely and uniquely determinable spatial position and orientation of the known shape 2 in six degrees of freedom—can be used for determining 6-DOF spatial information of the item it is attached to. Apparently, the item or part of it can also be the known shape 2 itself.

In the upper left example, the attached item is a measurement probe, in particular a tactile coordinate-measurement probe 106, and the method is measuring spatial coordinates of a measurement object approaches by the measurement probe. In a similar manner, the shown arm can also be actuated robot arm, which's posture in space, in particular of the tip of the arm is determined according to the method of the present invention. The robot arms posture in space is determined according to the position and orientation of the known shape.

The upper right illustration shows a worker carrying a handheld measurement probe 102 which is, comprises or is attached to an object of known shape 2. Thereby the measurement object, illustrated by a car body 101 can be measured. According to an aspect of the present invention, this reveals an additional method of three dimensional modelling by digitalizing an outer form of a measurement object.

This additional method involves a rough 3D modelling. The rough modelling comprises a taking of a range image of the measurement object 101 and optionally a taking of a visual picture of the measurement object 101 and generating a rough 3D model of the gathered data, in particular by combining information of the range and the visual image.

The additional method also involves a fine 3D modelling. The fine modelling comprises a measuring of at least one surface point of the measurement object with a tactile probe 102 by the 6-DOF determination of a known shape 2 by combined RIM and CAM information as described above. Thereby the exact spatial position and orientation of the surface point measured by the tactile probe is determined according to the position and orientation of the known shape with increased accuracy compared to the rough modelling.

The additional method then refines measurement points of the rough model according to the at least one surface point, by a fine adjusting at least one point of the rough 3D model according to the at least one surface point of the fine modelling.

The lower right part of FIG. 7 shows a working tool 105 of a construction site machinery 104 as the item attached to the known shape 2, which's spatial coordinates are determined. The worksite machinery shown is an earth moving machine embodied as an excavator 104, but it can also be a dozer, grader, digger, etc.

In the lower right corner, the device 1 according to the invention is shown which is used for the 6-DOF determination of the known shape 2 within its field of view. In particular such a six degrees of freedom spatial position and orientation determination device 1 according to the invention, can comprise     a 3D range imaging unit, with a range imaging camera 4 having a first number of pixels for determining a range image 13 of a scenery as a three dimensional point cloud 202 information with a first angular resolution,     a 2D camera imaging unit, with a visual picture camera 5 having a second number of pixels for determining a two dimensional visual picture 14 of at least part of the scenery with a second angular resolution,
a digital image processing unit 66, and
a six dimensional known shape matching unit 67.

Therein, the six dimensional known shape matching unit 67 is built in such a way to determine a three dimensional virtual match of a 3D digital representation 11 of a known shape 2 within the range image 13 and the visual picture 14 or within a combination of a the range image 13 and the visual picture 14 and extracting six degree of freedom position and orientation of the known shape 2 in the scenery according to the virtual match.

A person skilled in the usage of the equipment referred to herein will be aware of many other application scenarios.

Figure 8:
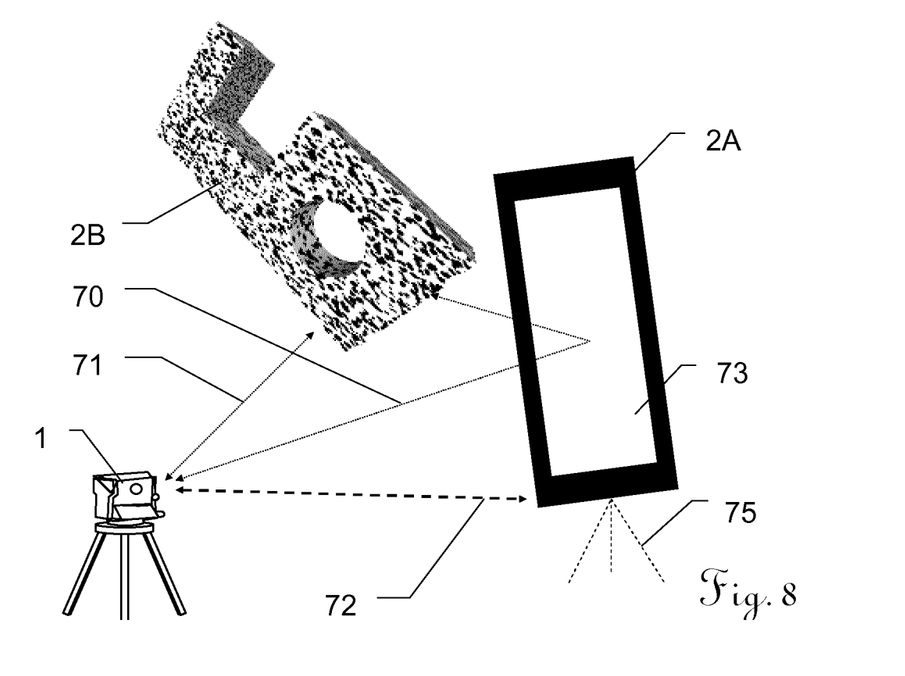
FIG. 8 shows an example of a look-behind-feature according to an aspect of the present invention.

FIG. 8 shows a special usage of the method according to the present invention to achieve a so called look behind measurement. This special method of generating a three dimensional model of a measurement object, comprises the steps of:

Determining the spatial position and orientation of a first known shape 2A as described above, wherein the first known shape 2A is attached to a mirror 73 and placed in a primary field of view of the range camera and the visual camera comprised in the device 1. In particular the first known shape 2A being a frame around the mirror 73 and the mirror 73 being reflective for the wavelengths of both of the visual camera 5 and the range camera 4.

This arrangement determines a secondary field of view of the range and visual camera, which is a subset of the primary field of view. The secondary field of view will be redirected by the mirror according to the position and orientation of the first known shape 2A, Thereby a measuring in the secondary field of view by the range-imaging means 4 and/or visual camera 5 can be executed, in particular by a position and orientation determination of a second known shape in the secondary field of view (e.g. behind the target object 2B wherefore the second known shape is not shown).

A transforming of the measurements taken in the secondary field of view into a coordinate system of the first field of view is the calculated according to the determined position and orientation of the mirror 73, which is determined by its frame 2A. Then a measurement—or generating of the three dimensional model according to measurements—from the primary and secondary field of view is combined.

Thereby a measuring of sections of the measurement object which are not visible or not unambiguously measurable in the primary field of view can be achieved. In particular, wherein the measurement apparatus 1 and the measurement object 2B are steady with respect to each other and the mirror 73 is movable. The mirror can be movable by a motor or by hand (as a handheld item) or it can be fixed to a tripod 75 if rearrangement of the mirror is not or not often required.

In a special embodiment of this look-behind-measurement, a lower resolution RIM-camera can be zoomed (and optionally also positional aligned—or tracked) to the mirror's field of view for achieving a higher 3D resolution, while the CAM-unit at higher resolution is evaluating a broader scenery comprising the mirror and determining it's position and orientation according to its (or specifically its frame's) known shape. In this zooming and/or tracking, the view of the RIM-camera can preferably also cover the mirror's frame or parts of it, for improved position and orientation determination of the mirror according to the invention.

For example, a digitalisation or modelling of the measurement object's shape from side, behind or inside can be achieved this way.

The methods according to the invention can be at least partly embodied as a computer program product with program code being stored on a machine readable medium or embodied as an electromagnetic wave, the program code being configured to automatically execute and operate the method for a six degree of freedom position and orientation determination of a known shape as described above, in particular the program is carried out on the digital image processing unit 66 as a digital computation unit of a six degree of freedom spatial position and orientation determination device 1.

In particular the invention relates to a six degrees of freedom spatial position and orientation determination device 1, comprising
 a 3D range imaging unit, with a range imaging camera 4 having a first number of pixels for determining a range image 13 of a scenery as a three dimensional point cloud 202 information with a first angular resolution,
 a 2D camera imaging unit, with a visual picture camera 5 having a second number of pixels for determining a two dimensional visual picture 14 of at least part of the scenery with a second angular resolution,
 a digital image processing unit 66, and
 a six dimensional known shape matching unit 67.

Therein, the six dimensional known shape matching unit 67 is built in such a way to determine a three dimensional virtual match of a 3D digital representation 11 of a known shape 2 within the range image 13 and the visual picture 14 or within a combination of a the range image 13 and the visual picture 14 and extracting six degree of freedom position and orientation of the known shape 2 in the scenery according to the virtual match.

What is claimed is:

1. A method for a six degree of freedom position and orientation determination of a three dimensional known shape in a scenery, the method comprising:
    taking a range image by means of a range imaging camera with a range image module having a sensor array with a first number of pixels, wherein for each of the first pixels a range information from the sensor to a point of the scenery is determined, resulting in a 3D cluster of points;
    taking a visual picture with a digital camera with an image sensor having a second number of pixels, resulting in a 2D picture, wherein the 2D picture includes intensity and spectral information, wherein a relation of the first and the second pixels fields of view is known, wherein the second number of pixels is higher than the first number of pixels;
    geometrically fitting of a stored 3D digital representation of the known shape in a virtual space to virtually match with the reproduction of the known shape in the taken 2D picture and the taken 3D cluster of points;
    a first matching of the 3D digital representation with the visual picture and a second matching of the 3D digital representation with the range image and determining the six degree of freedom position and orientation by combining the results of the first and second matching; and
    determining the six degree of freedom position and orientation of the known shape in the scenery according to the virtual match.

2. A method for a six degree of freedom position and orientation determination of a three dimensional known shape in a scenery, the method comprising:
- taking a range image by means of a range imaging camera with a range image module having a sensor array with a first number of pixels, wherein for each of the first pixels a range information from the sensor to a point of the scenery is determined, resulting in a 3D cluster of points;
- taking a visual picture with a digital camera with an image sensor having a second number of pixels, resulting in a 2D picture, wherein the 2D picture includes intensity and spectral information, wherein a relation of the first and second pixels fields of view is known, wherein the second number of pixels is higher than the first number of pixels;
- directional dithering of an optical axis of the range camera relative to an optical axis of the digital camera in a sub-resolution of the first pixels, introduced by means of a reversely used optical image stabilization unit, and combining multiple, directional dithered low resolution range images for increasing the resolution of the cluster of points beyond a resolution of the first pixels;
- geometrically fitting of a stored 3D digital representation of the known shape in a virtual space to virtually match with the reproduction of the known shape in the taken 2D picture and the resolution-increased 3D cluster of points; and
- determining the six degree of freedom position and orientation of the known shape in the scenery according to the virtual match.

3. The method according to claim 1, further comprising extracting a 3D geometrical information by combining information from the visual picture and information from the range image, wherein the combining comprises a matching of at least one geometrical feature of the known shape in both of the range image and the visual picture and a further matching of the geometrical feature in the 3D digital representation within the combined information.

4. The method according to claim 1,
wherein the position and orientation by combining the results of the first and the second matching are determined according to an adjustment calculus or a maximum likelihood algorithm.

5. The method according to claim 1, wherein the matching comprises:
- identifying a face by combining:
  - at least one of edge extraction of the face in the visual picture; and
  - face detection in the range image, preferably by fitting planes in the cluster of points, and
- matching the identified face and edge with a corresponding face of the 3D digital representation according to a least square or maximum likelihood algorithm.

6. The method according to claim 1, further comprising recognition of textural structures within the visual picture on the known shape, comprising an additional position and orientation determination according to the appearing size of at least one of the known shape and/or its texture in the visual picture.

7. The method according to claim 1, further comprising taking the visual picture and the range image from a single measurement apparatus with a single line of sight, wherein the taking of the range image and the visual picture is synchronized in time.

8. The method according to claim 1, further comprising evaluating intensity information determined from the reflected intensity of the range imaging light received by the range camera as intensity values of the distance measurement light scattered back by the known shape, and including the intensity information in the virtual match.

9. The method according to claim 1, further comprising determining a dependent position and orientation of an item attached to the known shape, the known shape being a known three dimensional solid volumetric body having a three dimensional outer configuration facilitating a precisely and uniquely determinable spatial position and orientation of the known shape in six degrees of freedom.

10. The method according to claim 9, wherein the attached item is a tactile coordinate-measurement probe, and the method is measuring spatial coordinates of a measurement object.

11. The method according to claim 9, wherein the attached item is a robot arm which's posture in space is determined according to the position and orientation of the known shape, and the method is determining position and orientation of the robots arm.

12. The method according to claim 9, wherein the attached item is a working tool of an earth moving machine which spatial coordinates are determined, wherein the earth moving machine is selected from the group consisting of a dozer, grader and digger, and the method includes determining position and orientation of the earth moving machine.

13. The method according to claim 1, further comprising using the known relation of the first and the second pixels in the step of fitting or determining.

14. A method of three dimensional modeling by digitalizing an outer form of a measurement object by:
- a rough 3D modeling comprising:
  - a taking of a range image of the measurement object;
  - a taking of a visual picture of the measurement object; and
  - generating a rough 3D model by combining information of the range and the visual image;
- a fine 3D modeling by:
  - measuring at least one surface point of the measurement object with a tactile probe, wherein the exact spatial position and orientation of the measurement point of the tactile probe is determined according to the method according to claim 1; and
- refining measurement points of the rough model according to the at least one surface point, by a fine adjusting of at least one point of the rough 3D model according to the at least one surface point of the fine modeling.

15. A method of generating a three dimensional model of a measurement object, comprising the steps of:
- determining the spatial position and orientation of a first known shape according to claim 1, wherein the first known shape is attached to a mirror and placed in a primary field of view of the range camera and the visual camera, the first known shape being a frame around the mirror and the mirror being reflective for the wavelengths of both of the visual camera and the range camera;
- determining a secondary field of view of the range and visual camera, which is a subset of the primary field of view being redirected by the mirror, according to the position and orientation of the first known shape;
- measuring in the secondary field of view by the range or visual camera, by position and orientation determination of a second known shape according to claim 1 in the secondary field of view;

transforming measurements taken in the secondary field of view into a coordinate system of the first field of view according to the determined position and orientation of the mirror; and generating the three dimensional model according to measurements from the primary and secondary field of view, for measuring sections of the measurement object which are not visible or not unambiguously measurable in the primary field of view.

16. A computer program product with program code being stored on a non-transitory machine readable medium, the program code being configured to automatically execute and operate the method comprising:

taking a range image by means of a range imaging camera with a range image module having a sensor array with a first number of pixels, wherein for each of the first pixels a range information from the sensor to a point of the scenery is determined, resulting in a 3D cluster of points;

taking a visual picture with a digital camera with an image sensor having a second number of pixels, resulting in a 2D picture, wherein the 2D picture includes intensity and spectral information, wherein a relation of the first and the second pixels fields of view is known, wherein the second number of pixels is higher than the first number of pixels;

geometrically fitting of a stored 3D digital representation of the known shape in a virtual space to virtually match with the reproduction of the known shape in the taken 2D picture and the taken 3D cluster of points;

a first matching of the 3D digital representation with the visual picture and a second matching of the 3D digital representation with the range image and determining the six degree of freedom position and orientation by combining the results of the first and second matching; and determining the six degree of freedom position and orientation of the known shape in the scenery according to the virtual match.

17. The method according to claim 4, wherein at least one of multiple faces and edges are three dimensionally matched.

18. The method according to claim 5, having the purpose of deriving uniqueness in the position and orientation determination according to the textural information.

19. The method according to claim 15, wherein the measurement apparatus and the measurement object are steady with respect to each other and the mirror is moveable.

20. The method according to claim 15, wherein the measurement apparatus and the measurement object are steady with respect to each other and the mirror is moveable, for modeling the measurement object from side, behind, or inside.

21. The method according to claim 2, further comprising extracting a 3D geometrical information by combining information from the visual picture and information from the range image, wherein the combining comprises a matching of at least one geometrical feature of the known shape in both of the range image and the visual picture and a further matching of the geometrical feature in the 3D digital representation within the combined information.

22. The method according to claim 2, wherein the position and orientation by combining the results of the first and the second matching are determined according to an adjustment calculus or a maximum likelihood algorithm.

23. The method according to claim 2, wherein the matching comprises:

identifying a face by combining:
at least one of edge extraction of the face in the visual picture; and
face detection in the range image, preferably by fitting planes in the cluster of points, and
matching the identified face and edge with a corresponding face of the 3D digital representation according to a least square or maximum likelihood algorithm.

24. The method according to claim 2, further comprising recognition of textural structures within the visual picture on the known shape, comprising an additional position and orientation determination according to the appearing size of at least one of the known shape or its texture in the visual picture.

25. The method according to claim 2, further comprising taking the visual picture and the range image from a single measurement apparatus with a single line of sight, wherein the taking of the range image and the visual picture is synchronized in time.

26. The method according to claim 2, further comprising evaluating intensity information determined from the reflected intensity of the range imaging light received by the range camera as intensity values of the distance measurement light scattered back by the known shape, and including the intensity information in the virtual match.

27. The method according to claim 2, further comprising determining a dependent position and orientation of an item attached to the known shape, the known shape being a known three dimensional solid volumetric body having a three dimensional outer configuration facilitating a precisely and uniquely determinable spatial position and orientation of the known shape in six degrees of freedom.

28. The method according to claim 27, wherein the attached item is a tactile coordinate-measurement probe, and the method is measuring spatial coordinates of a measurement object.

29. The method according to claim 27, wherein the attached item is a robot arm which's posture in space is determined according to the position and orientation of the known shape, and the method is determining position and orientation of the robots arm.

30. The method according to claim 27, wherein the attached item is a working tool of an earth moving machine which spatial coordinates are determined, wherein the earth moving machine is selected from the group consisting of a dozer, grader and digger, and the method includes determining position and orientation of the earth moving machine.

31. The method according to claim 2, further comprising using the known relation of the first and the second pixels in the step of fitting or determining.

32. A method of three dimensional modeling by digitalizing an outer form of a measurement object by:

a rough 3D modeling comprising:
a taking of a range image of the measurement object;
a taking of a visual picture of the measurement object; and
generating a rough 3D model by combining information of the range and the visual image;

a fine 3D modeling by:
measuring at least one surface point of the measurement object with a tactile probe, wherein the exact spatial position and orientation of the measurement point of the tactile probe is determined according to the method according to claim 2; and
refining measurement points of the rough model according to the at least one surface point, by a fine adjusting of at least one point of the rough 3D model according to the at least one surface point of the fine modeling.

33. A method of generating a three dimensional model of a measurement object, comprising the steps of:
- determining the spatial position and orientation of a first known shape according to claim 2, wherein the first known shape is attached to a mirror and placed in a primary field of view of the range camera and the visual camera, the first known shape being a frame around the mirror and the mirror being reflective for the wavelengths of both of the visual camera and the range camera;
- determining a secondary field of view of the range and visual camera, which is a subset of the primary field of view being redirected by the mirror, according to the position and orientation of the first known shape;
- measuring in the secondary field of view by the range or visual camera, by position and orientation determination of a second known shape according to claim 2 in the secondary field of view;
- transforming measurements taken in the secondary field of view into a coordinate system of the first field of view according to the determined position and orientation of the mirror; and
- generating the three dimensional model according to measurements from the primary and secondary field of view, for measuring sections of the measurement object which are not visible or not unambiguously measurable in the primary field of view.

34. The method according to claim 22, wherein at least one of multiple faces and edges are three dimensionally matched.

35. The method according to claim 23, having the purpose of deriving uniqueness in the position and orientation determination according to the textural information.

36. The method according to claim 33, wherein the measurement apparatus and the measurement object are steady with respect to each other and the mirror is moveable.

37. The method according to claim 33, wherein the measurement apparatus and the measurement object are steady with respect to each other and the mirror is moveable, for modeling the measurement object from side, behind, or inside.

* * * * *